United States Patent [19]

Pelletier

[11] Patent Number: 4,983,856
[45] Date of Patent: Jan. 8, 1991

[54] METHOD AND SYSTEM FOR INTERCONNECTING IN QUADRATURE TWO SYNCHRONOUS OR ASYNCHRONOUS THREE-PHASE NETWORKS

[75] Inventor: Pierre Pelletier, Boucherville, Canada

[73] Assignee: Hydro-Quebec, Montreal, Canada

[21] Appl. No.: 389,230

[22] Filed: Aug. 3, 1989

[30] Foreign Application Priority Data

Aug. 4, 1988 [CA] Canada .................................. 573807

[51] Int. Cl.⁵ .................................................. H02J 3/34
[52] U.S. Cl. ........................................ 307/20; 307/19; 307/83; 323/211
[58] Field of Search ..................................... 307/18-29, 307/44, 45, 64, 83, 85-87, 113, 115; 323/209-211

[56] References Cited

U.S. PATENT DOCUMENTS

4,621,198 11/1986 Roberge et al. ...................... 307/82

Primary Examiner—A. D. Pellinen
Assistant Examiner—David Osborn
Attorney, Agent, or Firm—Foley & Lardner, Schwartz, Jeffery, Schwaab, Mack, Blumenthal & Evans

[57] ABSTRACT

The present disclosure describes a method and a system for interconnecting a first and a second three-phase alternating electric networks. The system comprises a first transformer having secondary windings for producing a first and a second secondary three-phase voltages, each phase of the first secondary voltage being out of phase with respect to one of the phases of the second three-phase voltage by a first angle; a second transformer having secondary windings for producing a third and a fourth secondary, three-phase voltages, each phase of the third secondary voltage being out of phase with respect to one of the phases of said fourth voltage by a second angle different from said first angle; a plurality of variable reactive impedances for establishing between each phase of the first and second voltages and two phases of said third and fourth voltages, two single-phase interconnections of variable susceptances, respectively; and a regulator for operating the variable reactive impedances to vary the susceptances of the interconnections so as to establish a desired transfer of electric active power from one of the first and second networks to the other network while maintaining at a desired level an electric reactive power engaged in said transfer of active power.

47 Claims, 6 Drawing Sheets

METHOD AND SYSTEM FOR INTERCONNECTING IN QUADRATURE TWO SYNCHRONOUS OR ASYNCHRONOUS THREE-PHASE NETWORKS

BACKGROUND OF THE INVENTION

1. Field of the Invention

The present invention relates to a method and system for interconnecting two three-phase alternating electric networks operating synchronously or asynchronously at alternating voltages of equal or adjacent frequencies. To carry out such interconnection, the method and system use interconnections in quadrature.

In the present specification and in the appended claims, the term "network" is used to designate both independent three-phase electric networks for the transport or distribution of electric energy or portions of such networks.

2. Brief Description of the Prior Art

Most of the systems for interconnecting two alternating electric three-phase networks presently in operation are constituted by direct current interconnection ties comprising electric power converters carrying out from one network to the other an AC-DC-AC conversion of the electric current. Such an interconnection system has the disadvantage to require compensators for neutralizing the internal reactive power in order to maintain the voltage of the interconnection points at a desired level, as well as filters for attenuating the harmonics generated by the interconnection system.

In the U.S. Pat. No. 4,621,198 (ROBERGE et AL) issued on Nov. 4th, 1986, to the same Applicant, interconnection of two three-phase networks (each comprising phases A, B and C) by means of a plurality of variable reactive impedances is described. The variable impedances are operated to establish (a) three first interconnections, each having a first susceptance, between the phases A, the phases B and the phases C of the first and second networks, respectively, (b) three second interconnections, each having a second susceptance, between the phase A of the first network and the phase C of the second network, between the phase B of the first network and the phase A of the second network, and between the phase C of the first network and the phase B of the second network, respectively, and (c) three third interconnections, each having a third susceptance, between the phase A of the first network and the phase B of the second network, between the phase B of the first network and the phase C of the second network, and between the phase C of the first network and the phase A of the second network, respectively. A regulator measures electric parameters associated with at least one corresponding phase of the first and second networks and operates the three-phase variable reactive impedances in accordance with the so measured parameters in order to vary the susceptances of the interconnections. By appropriately varying the first, second and third susceptances, a desired transfer of active power from one of the two networks to the other can be established, while maintaining the reactive power engaged in such a transfer of active power at a desired level.

A drawback of the interconnection system of U.S. Pat. No. 4,621,198 is that the ratings of the elements of the interconnection system, in particular the variable impedances, must be selected to support a relatively important quantity of reactive power (vars) for each watt of active power transferred. The rating vars/watt of the impedances is accordingly high, thereby increasing the costs of the interconnection system.

OBJECT OF THE INVENTION

The main object of the present invention is to propose a method and a system for interconnecting two synchronous or asynchronous electric three-phase networks by means of variable reactive impedances, in which the rating vars/watt of the impedances can be considerably reduced.

SUMMARY OF THE INVENTION

More specifically, according to the invention, there is provided a method of interconnecting a first and a second three-phase alternating electric networks operating synchronously or asynchronously at respective three-phase alternating voltages of equal or adjacent frequencies, comprising the steps of:

producing from the three-phase voltage of the first network and by means of first-transformer means, a first and a second secondary, three-phase voltages, each phase of the first secondary voltage being out of phase with respect to one of the phases of the second three-phase voltage by a first angle;

producing from the three-phase voltage of the second network and by means of second transformer means, a third and a fourth secondary, three-phase voltages, each phase of the third secondary voltage being out of phase with respect to one of the phases of said fourth voltage by a second angle different from said first angle;

by means of a plurality of variable reactive impedances, establishing two single-phase interconnections, having susceptances which can be varied, between each phase of the first and second voltages and two phases of the third and fourth voltages which one out of phase by said second angle, respectively;

measuring electric parameters related to the operation of the first and second networks; and operating the variable reactive impedances in relation to the said measured parameters in order to vary the susceptances of the interconnections so as to establish through these interconnections and the first and second transformer means a desired transfer of active power from one of the first and second networks to the other network while maintaining at a desired level an electric reactive power engaged in this transfer of active power.

In accordance with the invention, there is also proposed a system for interconnecting a first and a second three-phase alternating electric networks operating synchronously or asynchronously at respective three-phase alternating voltages of equal or adjacent frequencies, comprising:

first transformer means having (a) primary windings supplied with the three-phase voltage of a first of said two networks, and (b) secondary windings for producing from the three-phase voltage of the first network a first and a second secondary three-phase voltages, each phase of the first secondary voltage being out of phase with respect to one of the phases of the second three-phase voltage by a first angle;

second transformer means having (a) primary windings supplied with the three-phase voltage of the second of said two networks, and (b) secondary windings for producing from the three-phase voltage of the second network a third and a fourth secondary, three-phase voltages, each phase of the third secondary voltage being out of phase with respect to one of the phases of said fourth voltage by a second angle different from said first angle;

a plurality of variable reactive impedances for establishing between each phase of said first and second voltages and two phases of said third and fourth voltages out of phase by said second angle, two single-phase interconnections of variable susceptances, respectively; and regulating means for measuring electric parameters related to the operation of the first and second networks, and for operating the variable reactive impedances in relation to the so measured parameters in order to vary the susceptances of the interconnections so as to establish through these interconnections and the first and second transformer means a desired transfer of electric active power from one of the first and second networks to the other network while maintaining at a desired level an electric reactive power engaged in this transfer of active power.

According to a preferred embodiment of the present invention, the first angle is 180°, the second angle is 90° and the first and second transformer means are characterized so that no phase shift exists between the first and third secondary voltages.

The objects, advantages and other features of the present invention will become more apparent upon reading of the following non restrictive description of preferred embodiments thereof, given with reference to the accompanying drawings.

DETAILED DESCRIPTION OF THE PREFERRED EMBODIMENTS

Figure 1:
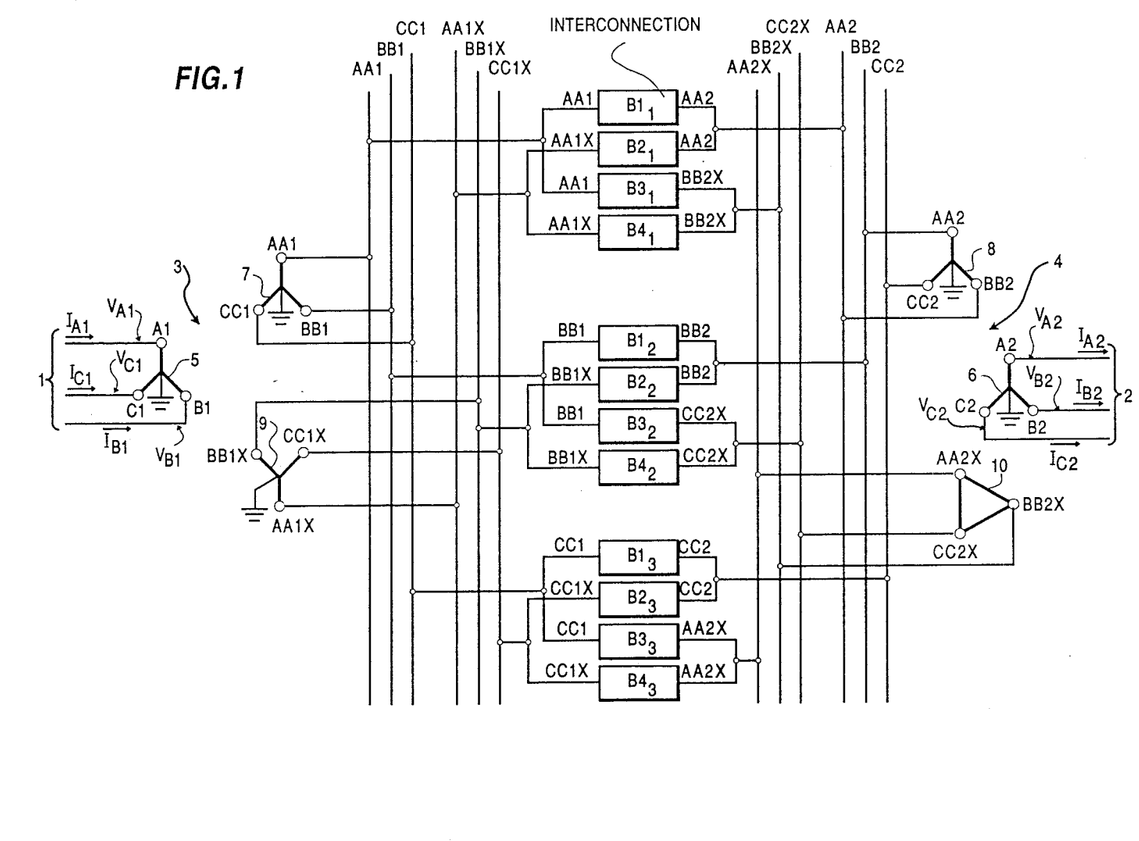
FIG. 1 represents a system according to the present invention, interconnecting two three-phase, synchronous or asynchronous networks.

FIG. 1 represents a system according to the present invention, interconnecting a first network 1 and a second network 2. The two networks 1 and 2 operate synchronously or asynchronously at voltages of equal or adjacent frequencies.

The interconnection system of FIG. 1 comprises a first transformer 3 (Y-y-$y_6$), and a second transformer 4 (Y-y-$d_{11}$).

The Y-connected primary windings 5 of the transformer 3 are respectively connected to the phases A1, B1, and C1 of the three-phase voltage of the first network 1, while the Y-connected primary windings 6 of the transformer 4 are respectively connected to the phases A2, B2 and C2 of the three-phase voltage of the second network 2.

The y-connected secondary windings 7 of the transformer 3 produce a first secondary three-phase voltage having phases AA1, BB1 and CC1, while the $y_6$-connected secondary windings 9 produce a second, secondary three-phase voltage with phases AA1X, BB1X and CC1X out of phase by 180° with respect to the phases AA1, BB1 and CC1, respectively.

Regarding the three-phase transformer 4, its y-connected secondary windings 8 produce a third secondary three-phase voltage having phases AA2, BB2 and CC2, and its $d_{11}$-connected secondary windings 10 produce a fourth, secondary three-phase voltage having phases AA2X, BB2X and CC2X. The phases AA2, BB2 and CC2 are out of phase by 90° with respect to the phases BB2X, CC2X and AA2X, respectively.

As can be appreciated, no phase shift is caused by the transformers 3 and 4 between the phases AA1, BB1, CC1 and the phases AA2, BB2, CC2, respectively, due to the Y-y-$y_6$ windings of the transformer 3 and Y-y-$d_{11}$ windings of the transformer 4.

A plurality of variable reactive impedances establishes three groups of single-phase interconnections of variable susceptances, namely, $B1_1$, $B2_1$, $B3_1$ and $B4_1$; $B1_2$, $B2_2$, $B3_2$ and $B4_2$; and $B1_3$, $B2_3$, $B3_1$ and $B4_3$.

Referring to the first group of four interconnections $B1_1$–$B4_1$, the interconnection $B1_1$ interconnects the phases AA1 and AA2, the interconnection $B2_1$ interconnects the phases AA1X and AA2, the interconnection $B3_1$ interconnects the phases AA1 and BB2X, and the interconnection $B4_1$ interconnects the phases AA1X and BB2X. Accordingly, the interconnections $B1_1$ and $B3_1$ have their left terminals connected to the same phase AA1, but their right terminals respectively connected to two phases out of phase by 90° (in quadrature), namely AA2 and BB2X. In the same manner, the interconnections $B2_1$ and $B4_1$ have their left terminals connected to the same phase, AA1X, but their right terminals respectively connected to the phases AA2 and BB2X, which are in quadrature, that is out of phase by 90°. It should also be pointed out that the interconnections $B1_1$ and $B2_1$ have their right terminals connected to the same phase AA2, and their left terminals respectively connected to two phases out of phase by 180°, namely AA1 and AA1X. Also, the interconnections $B3_1$ and $B4_1$ have their right terminals connected to a same phase, BB2X, but their left terminals respectively connected to the phases AA1 and AA1X, out of phase by 180°. As can also be appreciated, no phase shift is produced by the transformers 3 and 4 between the phases AA1 and AA2 (interconnection $B1_1$), while these two transformers 3 and 4 produce (a) a phase shift of 180° between the phases AA1X and AA2 (interconnection $B2_1$), (b) a phase shift of 90° (quadrature) of the phase AA1 with respect to the phase BB2X (interconnection $B3_1$) and (c) a phase shift of −90° (quadrature) of the phase AA1X with respect to the phase BB2X (interconnection $B4_1$).

The two other groups of four interconnections $B1_2$–$B4_2$ and $B1_3$–$B4_3$ are similar, but interconnect different phases, namely (a) the phases BB1, BB1X and BB2, CC2X, and (b) the phases CC1, CC1X and CC2, AA2X, respectively. More specifically, the interconnection $B1_2$ interconnects the phases BB1 and BB2, the interconnection $B2_2$ the phases BB1X and BB2, the interconnection $B3_2$ the phases BB1 and CC2X, the interconnection $B4_2$ the phases BB1X and CC2X, the interconnection $B1_3$ the phases CC1 and CC2, the interconnection $B2_3$ the phases CC1X and CC2, the interconnection B3₃ the phases CC1 and AA2X, and the interconnection B4₃ the phases CC1X and AA2X.

It should be pointed out here that there is no requirement for the two networks 1 and 2 to operate at voltages of the same amplitude. Indeed, they can operate at voltages of different amplitudes, provided that the transformers 3 and 4 have ratios suitable to produce secondary three-phases voltages of amplitudes appropriate to allow transfer of active power from any one of the two networks 1 and 2 to the other network. As an example, the amplitude of the four secondary three-phase voltages can be the same.

Figure 2:
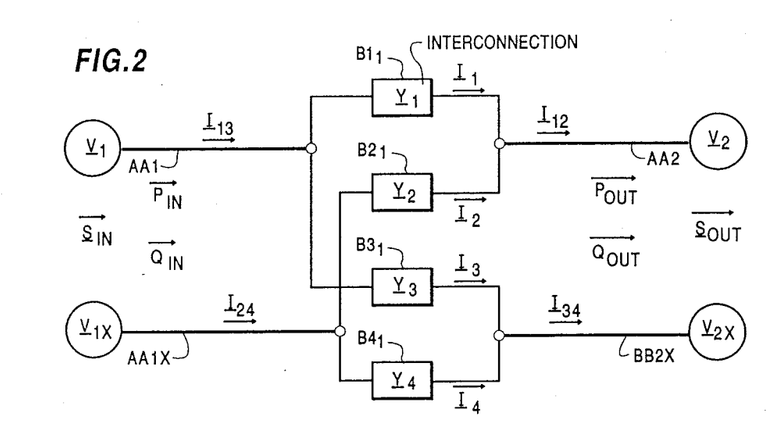
FIG. 2 is a diagram illustrating the principle of operation of the interconnection method and system according to the present invention.

Let us now examine with reference to FIG. 2 the operation of the interconnection system in accordance with the present invention with reference to one of the three groups of four interconnections, B1₁–B4₁, keeping in mind that the same applies to the two other groups, B1₂–B4₂ and B1₃–B4₃. It should be pointed out here that the underlined variables in the following description are complex variables.

In the description given hereinafter, the following definitions are considered:

$\underline{V}_1$: complex voltage of the phase AA1;
$\underline{V}_{1X}$: complex voltage of the phase AA1X;
$\underline{V}_2$: complex voltage of the phase AA2;
$\underline{V}_{2X}$: complex voltage of the phase BB2X;
$\underline{I}_{13}$: complex current through both the interconnections B1₁ and B3₁;
$\underline{I}_{24}$: complex current through both the interconnections B2₁ and B4₁;
$\underline{I}_{12}$: complex current through both the interconnections B1₁ and B2₁;
$\underline{I}_{34}$: complex current through both the interconnections B3₁ and B4₁;
$\underline{Y}_1$: complex admittance of the interconnection B1₁;
$\underline{Y}_2$: complex admittance of the interconnection B2₁;
$\underline{Y}_3$: complex admittance of the interconnection B3₁;
$\underline{Y}_4$: complex admittance of the interconnection B4₁;
$\underline{I}_1$: complex current through the interconnection B1₁;
$\underline{I}_2$: complex current through the interconnection B2₁;
$\underline{I}_3$: complex current through the interconnection B3₁;
$\underline{I}_4$: complex current through the interconnection B4₁;
$\underline{S}_{IN}$: the complex input power from the first network 1;
$\underline{S}_{OUT}$: the complex output power supplied to the network 2;
$P_{IN}$: input active power from the network 1;
$P_{OUT}$: output active power supplied to the network 2; and
$Q_{IN}, Q_{OUT}$: input and output reactive powers engaged in the transfer of active power ($P_{IN}, P_{OUT}$) from the first 1 to the second 2 networks.

Considering the interconnections B1₁ to B4₁ purely reactive, the admittances of the latter, that is their susceptance, can be varied, as a non-limitative example only, in accordance with the following four relationships with respect to the phase angle δ between the phases A₁, B₁ and C₁ of the three-phase voltage of the first network 1 and the corresponding phases A₂, B₂ and C₂ of the three-phase voltage of the second network 2, respectively, and with respect to the two adjustable variables, namely a susceptance variable B and an angle variable θ:

$$\underline{Y}_1 = -j B \sin(\delta+\theta) \qquad (1)$$

$$\underline{Y}_2 = j B \sin(\delta+\theta) \qquad (2)$$

$$\underline{Y}_3 = -j B \cos(\delta+\theta) \qquad (3)$$

$$\underline{Y}_4 = j B \cos(\delta+\theta) \qquad (4)$$

Using the above admittance values $\underline{Y}_1$ to $\underline{Y}_4$, the complex input power $\underline{S}_{IN}$ and the complex output power $\underline{S}_{OUT}$ are calculated:

$$\underline{S}_{IN} = \underline{V}_1 \underline{I}_{13}{}^* + \underline{V}_{1X} \underline{I}_{24}{}^* = 2 B V_1 V_2 (\cos\theta - j \sin\theta) \qquad (5)$$

$$\underline{S}_{OUT} = \underline{V}_2 \underline{I}_{12}{}^* + \underline{V}_{2X} \underline{I}_{34}{}^* = 2 B V_1 V_2 (\cos\theta + j \sin\theta) \qquad (6)$$

From equations 5 and 6, the input active power $P_{IN}$, the output active power $P_{OUT}$, the input $Q_{IN}$ and output $Q_{OUT}$ reactive powers engaged in the transfer active power ($P_{IN}, P_{OUT}$) are determined:

$$P_{IN} = P_{OUT} = 2 B V_1 V_2 \cos\theta \qquad (7)$$

$$Q_{IN} = -2 B V_1 V_2 \sin\theta \qquad (8)$$

$$Q_{OUT} = 2 B V_1 V_2 \sin\theta \qquad (9)$$

The signs of the different powers are given in relation with the directions of the arrows in FIG. 2. V₁ and V₂ are respectively the amplitude of the phasor of the voltages $\underline{V}_1$ and $\underline{V}_{1X}$ and the amplitude of the phasor of the voltages $\underline{V}_2$ and $\underline{V}_{2X}$. It is very interesting to notice that the different powers $P_{IN}$, $P_{OUT}$, and $Q_{IN}$ and $Q_{OUT}$ are completely independent from the phase angle δ between the three-phase voltages of the first and second networks 1 and 2. Also, the input and output reactive powers $Q_{IN}$ and $Q_{OUT}$ are in opposite directions but of equal amplitude. Accordingly, there are two equations, one for $P_{IN}$ and $P_{OUT}$ and the other for $Q_{IN}$ and $Q_{OUT}$, and two adjustable variables, namely B and θ. By appropriately adjusting the susceptance variable B and the angle variable θ, the level and direction of the transfer of active power from one network to the other ($P_{IN}$, $P_{OUT}$) can be adjusted as desired, while a desired amount of reactive power ($Q_{IN}$, $Q_{OUT}$) engaged in the transfer of active power is produced or absorbed by the variable reactive impedances. It is even possible to adjust the reactive powers $Q_{IN}$ and $Q_{OUT}$ to zero by selecting θ=0. In the latter case, by appropriately selecting the value of the susceptance variable B, it is possible to transfer the desired active power from one of the two networks to the other without producing nor absorbing reactive power through the variable reactive impedances.

Figure 3:
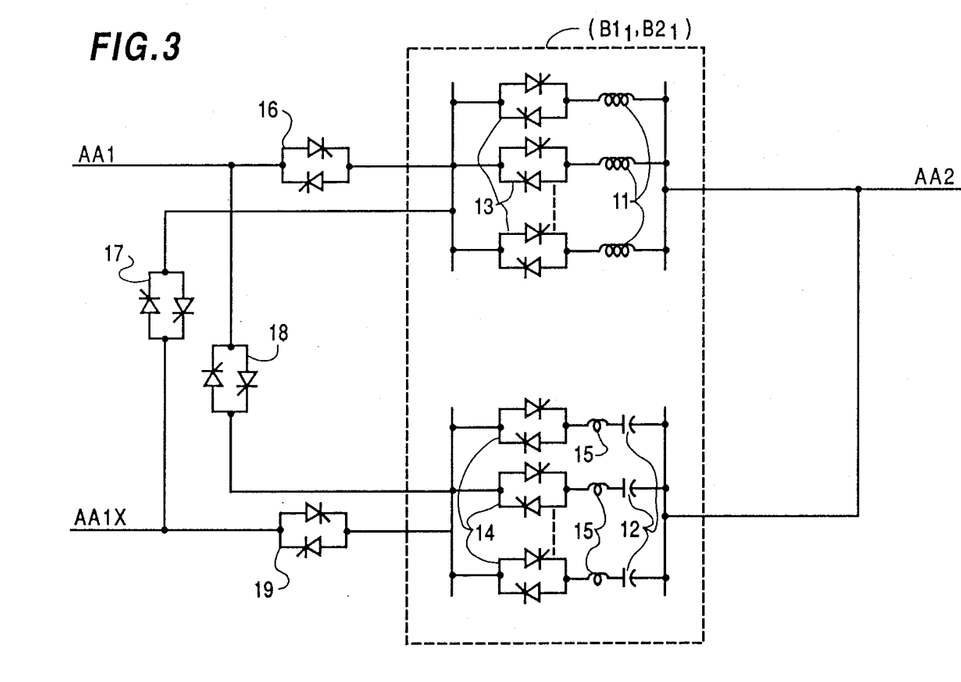
FIG. 3 is a possible embodiment for the variable reactive impedances of the system of FIG. 1, through which the different phases of the two networks are interconnected.

FIG. 3 of the drawings illustrates a non limitative example of embodiment for the variable reactive impedances of the interconnection system of FIG. 1.

As can be appreciated from equations (1) and (2), the interconnection B1₁ is inductive or capacitive while the interconnection B2₁ is capacitive or inductive, respectively.

Accordingly, the interconnections B1₁ and B2₁ can be established by means of a variable reactive impedance comprising a bank of inductors 11 connected in parallel and a bank of capacitors 12 also connected in parallel. The inductors 11 are switched by means of thyristor valves 13 while the capacitors 12 are switched by means of thyristor valves 14. An inductor 15 is connected in series with each capacitor 12 in order to protect the thyristor valves 14. Of course, a suitable number of inductors 11 and of capacitors 12 can be mounted according to the requirements of a specific application. The fixed inductance and capacitance values of the different inductors 11 and capacitors 12 can follow a geometric progression or vary arithmetically. A variable inductor and a variable capacitor can also be introduced in the respective banks. Alternatively, a phase-controlled inductor can possibly be inserted in the bank of inductors 11.

The banks of inductors 11 and of capacitors 12 are connected on one side to the phase AA2, and on the other side to the phases AA1 and AA1X through thyristor valves 16, 17, 18 and 19. When the interconnection $B1_1$ must be inductive, the thyristor valve 16 is switched on, while the thyristor valve 18 is switched off. When the latter interconnection must be capacitive, the thyristor valve 18 is switched on while the thyristor valve 16 is switched off. In the same manner, the thyristor valve 17 is switched on and the valve 19 switched off when the interconnection $B2_1$ must be inductive, while the valve 19 is switched on and the valve 17 switched off when the latter interconnection must be capacitive.

Although the valves 13 and 14 are advantageously thyristor valves, the valves 16, 17, 18 and 19 can be replaced by triacs, or electromagnetically operated mechanical contacts, as the required speed and the frequency of switching of these valves 16, 17, 18 and 19 are low compared to that of the valves 13 and 14.

Of course, five other banks of inductors 11 and five other banks of capacitors 12, as illustrated in FIG. 3, must be provided to establish the five other pairs of interconnections $B3_1$, $B4_1$; $B1_2$; $B2_2$; $B3_2$, $B4_2$; $B1_3$, $B2_3$ and $B3_3$, $B4_3$.

Figure 4:
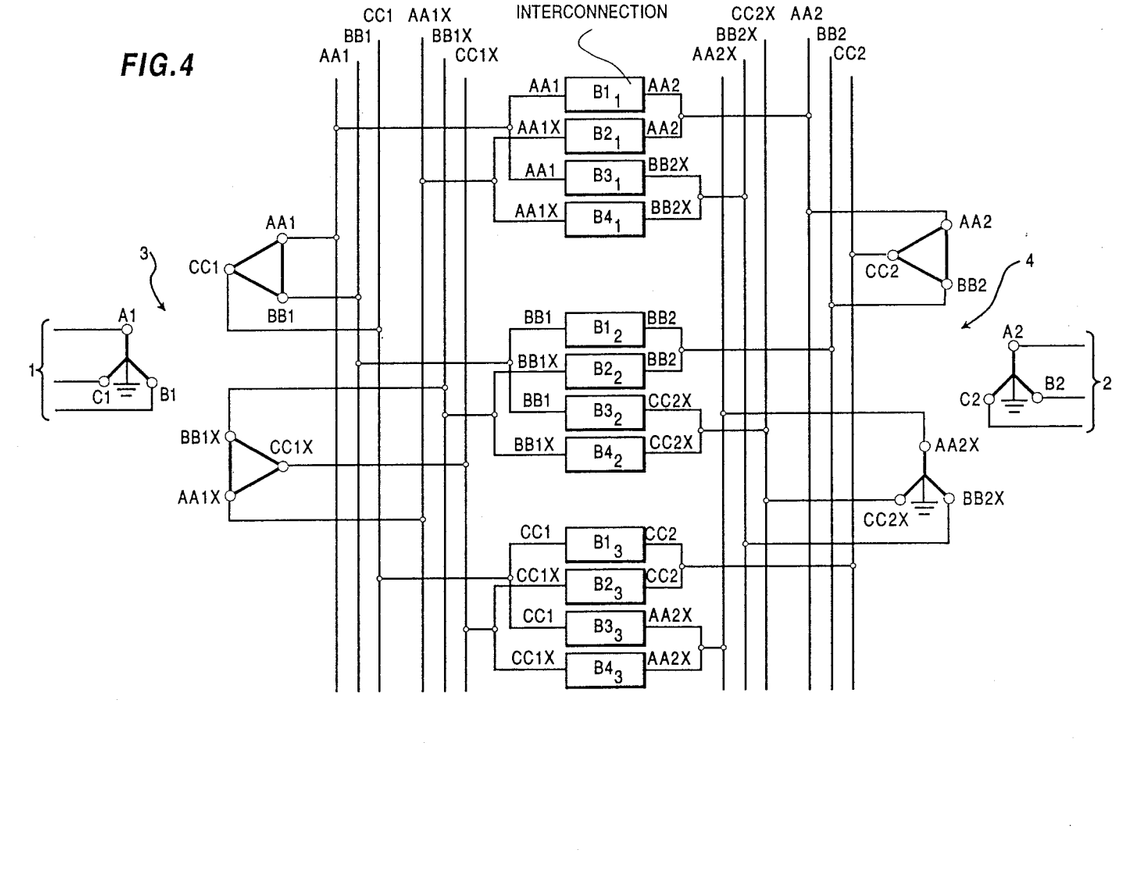
FIG. 4 is a modified version of the interconnection system of FIG. 1.

FIG. 4 illustrates an interconnection system similar to that of FIG. 1 but with the three-phase transformer 3 having Y-$d_1$-$d_7$ windings and with the three-phase transformer 4 having y-$d_1$-y windings. One skilled in the art can appreciate that the transformers 3 and 4 of FIG. 4 cause a phase shift of $-30°$ to the phases AA1, BB1, CC1, AA1X, BB1X, CC1X, AA2, BB2, CC2, AA2X, BB2X and CC2X with respect to the same phases in FIG. 1. As all the secondary voltage phases are phase shifted by the same angle, the interconnection system of FIG. 4 operates in the same manner as that described hereinabove with reference to FIGS. 1 and 2. This is valid for any phase shift provided that all the secondary voltage phases are phase shifted by a same angle.

Figure 5:
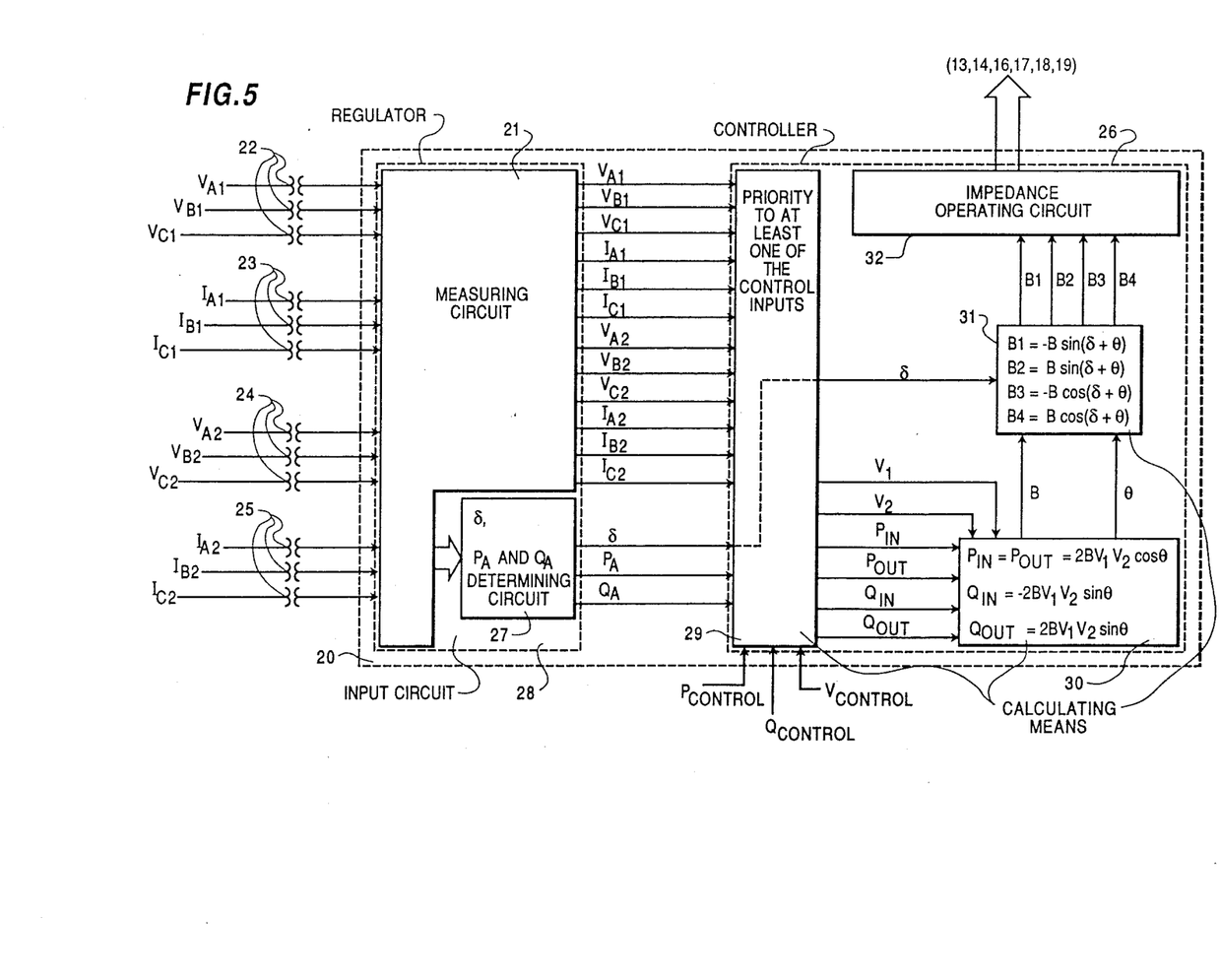
FIG. 5 is a block diagram of a regulator associated with the interconnection system of FIGS. 1 and 4.

FIG. 5 of the attached drawings illustrates the structure of regulator 20 which operates the variable reactive impedances in order to establish the different interconnections, $B1_1$-$B4_1$-$B4_2$, and $B1_3$-$B4_3$. Of course, the variable impedances are operated through the thyristor valves 13, 14, 16, 17, 18 and 19 of FIG. 3.

The regulator 20 comprises an input circuit 28 provided with a measuring circuit 21 supplied with the single-phase voltages $V_{A1}$, $V_{B1}$, $V_{C1}$ (identified in FIG. 1) of the first network 1 through voltage transformers 22, with the single-phase currents $I_{A1}$, $I_{B1}$ and $I_{C1}$ (identified in FIG. 1) of the first network 1 through current transformers 23, with the single-phase voltages $V_{A2}$, $V_{B2}$ and $V_{C2}$ (identified in FIG. 1) of the second network 2 through voltage transformers 24, and with the single-phase currents $I_{A2}$, $I_{B2}$ and $I_{C2}$ (identified in FIG. 1) of the second network 2 through current transformers 25. The measuring circuit 21 produces output signals representative of the single-phase voltages $V_{A1}$, $V_{B1}$, $V_{C1}$, $V_{A2}$, $V_{B2}$ and $V_{C2}$, and of the single-phase currents $I_{A1}$, $I_{B1}$, $I_{C1}$, $I_{A2}$, $I_{B2}$ and $I_{C2}$. The input circuit 28 further comprises a circuit 27 supplied with the above output signals from the measuring circuit 21 for determining from these signals (a) the phase angle $\delta$ between the voltages $V_{A1}$ and $V_{A2}$, the voltages $V_{B1}$ and $V_{B2}$, and voltages $V_{C1}$ and $V_{C2}$, (b) the active power $P_A$ actually transferred from one of the first and second networks 1 and 2 to the other of these two networks, and (c) the reactive power $Q_A$ actually engaged in the actual transfer of active power $P_A$.

The regulator 20 further comprises a controller 26 having a first calculating means 29 supplied with the signals from the measuring circuit 21, with the signals $\delta$, $P_A$ and $Q_A$ from the circuit 27, and with a control signal $P_{CONTROL}$ indicative of the desired transfer of active power from one network 1 or 2 to the other network, a control signal $Q_{CONTROL}$ indicative of the desired level of reactive power engaged in the desired transfer of active power, and a control signal $V_{CONTROL}$ representative of a desired amplitude for the three-phase voltage of one the first and second networks 1 and 2, for calculating values for the above identified powers $P_{IN}$, $P_{OUT}$, $Q_{IN}$ and $Q_{OUT}$ and for the voltage amplitudes $V_1$ and $V_2$, which are used to calculate the susceptance B1 of the interconnections $B1_1$, $B1_2$ and $B1_3$, the susceptance B2 of the interconnections $B2_1$, $B2_2$ and $B2_3$, the susceptance B3 of the interconnections $B3_1$, $B3_2$ and $B3_3$ and the susceptance B4 of the interconnections $B4_1$, $B4_2$ and $B4_3$, as will be described in detail hereinafter.

The controller 26 further comprises a second calculating means 30, supplied with the signals $P_{IN}$, $P_{OUT}$, $Q_{IN}$, $Q_{OUT}$, $V_1$ and $V_2$ from the calculating means 29, for calculating the susceptance variable B and the angle variable $\theta$, using the equations (7), (8) and (9). The controller 26 further comprises a third calculating means 31 for calculating from the variables B and $\theta$ and the angle $\delta$ from the circuit 27 the susceptances B1, B2, B3 and B4, using the following relationships:

$$B1 = -B \sin(\delta + \theta) \tag{10}$$

$$B2 = B \sin(\delta + \theta) \tag{11}$$

$$B3 = -B \cos(\delta + \theta) \tag{12}$$

$$B4 = B \cos(\delta + \theta) \tag{13}$$

The equations (10), (11), (12) and (13) are respectively derived from the equations (1), (2), (3) and (4), taking into consideration that the variable reactive impedances of the interconnection system are purely reactive.

The controller 26 finally comprises a circuit 32 for operating the thyristor valves 13, 14, and 16 to 19 of all the variable reactive impedances to adjust the susceptances B1, B2, B3 and B4 of the interconnections $B1_1$-$B4_1$, $B1_2$-$B4_2$, and $B1_3$-$B4_3$, at the values calculated by the calculation means 31.

The controller 26 is advantageously designed on the basis of a microprocessor. The susceptances of the different interconnections can be selected by the controller from a matrix of values of these susceptances stored in the microprocessor, in relation to appropriate input signals. The microprocessor can also calculate the susceptances in real time, as described with reference to FIG. 5, provided that such calculation is fast enough.

The input signals $P_{CONTROL}$ and $Q_{CONTROL}$ can be varied so as to modulate the transfer of active power from one network to the other and the reactive power engaged in this transfer of active power in order to damp oscillations occurring on at least one of the first and second networks.

The input control signal $V_{CONTROL}$ applied to the calculating means 29 allows the calculation of susceptances B1, B2, B3 and B4 suitable to produce or absorb a determined quantity of reactive power suitable to regulate the three-phase voltage of one of the two networks 1 and 2 at the value $V_{CONTROL}$. The interconnection system then operates as a static compensator.

The calculating means 29 may be programmed to give priority to at least one of the control signals $P_{CONTROL}$, $Q_{CONTROL}$ and $V_{CONTROL}$. Depending on the priority control signal, the values $P_{IN}$, $P_{OUT}$, $Q_{IN}$, $Q_{OUT}$, $V_1$ and $V_2$ are so calculated by the calculating means 29 to obtain susceptances B1, B2, B3 and B4 suitable to establish with priority, a desired transfer of active power from one network to the other, a desired level of reactive power engaged in the transfer of active power, or a desired amplitude for the three-phase voltage of one of the two networks by generating or absorbing through the variable impedances an appropriate amount of reactive power. Of course, the above priorities can be programmed or modified at will.

Last of all, it should be mentioned that the powers given by the equations (5), (6), (7), (8) and (9) are single-phase powers, while the powers $P_a$, $Q_A$, $P_{CONTROL}$, $Q_{CONTROL}$ of FIG. 5 can be three-phase or single-phase powers. As it is well known, conversion of a single-phase power into a three-phase power is carried out by multiplying the single-phase power by the factor 3.

One of the objects of the following interconnection system is to propose a system allowing to control reactive power either absorbed or generated by the interconnection system with respect to one of the networks independently from the reactive power either absorbed or generated by the system with respect to the other network.

Referring now to FIGS. 1 and 4 in which it can be seen respectively a system for interconnecting two three-phase networks operating synchronously of asynchronously. It has been found that it is possible, during a transfer of active power between the two networks to establish a desired level of reactive power either absorbed or generated by the system with respect to the first network independently from a second desired level of reactive power either absorbed or generated by the system with respect to the second network. To obtain this result, first the transformers 3 and 4 of the system must have respectively transformation ratios $n_1$ and $n_2$ selected so that:

$$\frac{V_1}{n_1} \neq \frac{V_2}{n_2}$$

where $V_1$ and $V_2$ are respectively the three-phase voltages of the first and second networks; and second, the system must be characterized by the fact that the two single-phase interconnections of the variable susceptances, namely the pairs of interconnections $B1_1$ and $B2_1$, $B3_1$ and $B4_1$, $B1_2$ and $B2_2$, $B3_2$ and $B4_2$, $B1_3$ and $B2_3$, and $B3_3$ and $B4_3$, are not conjugated so that the regulator 20 (shown on FIG. 5) can vary the susceptances of the interconnections to establish a desired level of reactive power either absorbed or generated by the system with respect to the first network independently from a second desired level of reactive power either absorbed or generated by the system with respect to the second network, during a transfer of active power between the two networks.

Referring now to FIG. 5, one can see the regulator 20 by which the reactive variable impedances can be operated to transfer a desired level of electric active power, an absorption or a generation of reactive power by the system with respect to the first network, and an absorption or a generation of reactive power by the system with respect to the second network.

The calculating means 29, 30 and 31 calculate the first susceptance B1, the second susceptance B2, the third susceptance B3 and the fourth susceptance B4 according to the following equations:

$$B1 = \tfrac{1}{2}(-B_M \sin(\delta+\theta) - k \sin^2(\delta+\theta))$$

$$B2 = \tfrac{1}{2}(B_M \sin(\delta+\theta) - k \sin^2(\delta+\theta))$$

$$B3 = \tfrac{1}{2}(-B_M \cos(\delta+\theta) - k \cos^2(\delta+\theta))$$

$$B4 = \tfrac{1}{2}(B_M \cos(\delta+\theta) - k \cos^2(\delta+\theta))$$

where:

$$\delta = \theta_1 - \theta_2$$

$$\theta = \tan^{-1} \frac{[n_2^2 Q_2/V_2^2 - n_1^2 Q_1/V_1^2]}{P[n_1^2/V_1^2 - n_2^2/V_2^2]}$$

$$B_M = \frac{n_1 n_2 P}{V_1 V_2 \cos\theta}$$

$$k = \frac{(Q_1 - Q_2)}{V_1^2/n_1^2 - V_2^2/n_2^2}$$

where P is the desired transfer of electric active power, $Q_1$ is the reactive power either absorbed or generated by the system with respect to the first network, $Q_2$ is the reactive power either absorbed or generated by the system with respect to the second network, $\theta_1$ is the phase angle associated to the three-phase voltage of the first network and $\theta_2$ is the phase angle associated with the voltage of the second network. The variables P, $Q_1$ and $Q_2$ are selected respectively in function of the desired level of active power to be transferred from one of the networks to the other, the desired level of reactive power either absorbed or generated by the system with respect to the first network and the level of reactive power either absorbed or generated by the system with respect to the second network. It can be appreciated that when the value of P is positive, it means that the transfer of active power is made from the first network to the second network, and when the value of P is negative, it means that an active power is transferred from the second network to the first network.

The circuit 32 for operating the variable reactive impedances is used to establish the first $B1_1$, fifth $B1_2$ and ninth $B1_3$ interconnections having the first calculated susceptance B1, to establish the second $B2_1$, sixth $B2_2$ and tenth $B2_3$ interconnections having the second calculated susceptance B2, to establish the third $B3_1$, seventh $B3_2$ and eleventh $B3_3$ interconnections having the third calculated susceptance $B3_3$, and to establish the fourth $B4_1$, eighth $B4_2$ and twelfth $B4_3$ interconnections having the fourth calculated susceptance B4.

When the value of P is limited by the following relation:

$$-90° < \theta < 90°,$$

P represents a desired transfer of electric active power from the first network to the second network. However, when the value of P is limited by the following relation:

$$90° < \theta < 270°,$$

then P represents the desired transfer of electric active power from the second network to the first network.

Preferably, the variables $Q_1$ and $Q_2$ are limited by the following relation:

$$-1 < k < 1.$$

It can be appreciated that in the case where the system is conjugated that is:

$$\frac{V_1}{n_1} = \frac{V_2}{n_2},$$

the calculating means 29, 30 and 31 calculate the first susceptance B1, the second susceptance B2, the third susceptance B3 and the fourth susceptance B4 according to the following equations:

$$B1 = -\tfrac{1}{2}j\, B_M \sin(\delta + \theta)$$

$$B2 = \tfrac{1}{2}j\, B_M \sin(\delta + \theta)$$

$$B3 = -\tfrac{1}{2}j\, B_M \cos(\delta + \theta)$$

$$B4 = \tfrac{1}{2}j\, B_M \cos(\delta + \theta)$$

where:

$$\delta = \theta_1 - \theta_2$$

$$\theta = \tan^{-1}[-Q/P]$$

$$B_M = \frac{n_1 n_2 P}{V_1 V_2 \cos\theta}$$

where P is the desired transfer of electric active power, Q is the desired level of reactive electric power engaged during the transfer of active power, $\theta_1$ is the phase angle associated with the three-phase voltage of the first network and $\theta_2$ is the phase angle associated with the voltage of the second network. The values of P and Q are selected respectively in function of the desired level of active power to be transferred from one of the networks to the other, and the desired level of reactive electric power engaged during the transfer of active power.

Accordingly, the method by which the system can either absorb or generate a reactive power with respect to one of the networks independently of the reactive power either absorbed or generated with respect to the second network comprises the following steps:

first, determining the active power P to be transferred from one of the networks to the other;

second, determining the voltages applied to the admittances and the secondaries of the transformers 3 and 4 from the network voltages $V_1$ and $V_2$ and the transformation ratio $n_1$ and $n_2$ so that:

$$\frac{V_1}{n_1} \neq \frac{V_2}{n_2'},$$

third, calculating the variable $\theta$ from the reactive power $Q_1$ and $Q_2$ which are predetermined in function of the needs of the networks, and from the active power P according to the following equation:

$$\theta = \tan^{-1}\left[\frac{\dfrac{n_2^2 Q_2}{V_2^2} - \dfrac{n_1^2 Q_1}{V_1^2}}{P\left[\dfrac{n_1^2}{V_1^2} - \dfrac{n_2^2}{V_2^2}\right]}\right],$$

fourth, calculating $B_M$ from the values of $\theta$ and P according to the following equation:

$$B_M = \frac{n_1 n_2 P}{\cos\theta\, V_1 V_2},$$

the value of $B_M$ is also related to the maximum setting up of the inductances and the capacitors in the system for transferring a given active power according to the following equations:

$$B_M = \frac{(B2 - B1)}{j} \text{ for } (\delta + \theta) = 90°$$

$$B_M = \frac{(B4 - B3)}{j} \text{ for } (\delta + \theta) = 0°,$$

fifth, calculating the asymmetrical factor k of the susceptances according to the following equation:

$$k = \left[\frac{Q_1 - Q_2}{\left(\dfrac{V_1^2}{n_1^2} - \dfrac{V_2^2}{n_2^2}\right)}\right],$$

this asymmetrical factor k has an influence over the maximum setting up of inductances and capacitors for a given transfer of power according to the following equations:

$$k = \frac{-(B1 + B2)}{j} \text{ for } (\delta + \theta) = 90°$$

$$k = \frac{-(B3 + B4)}{j} \text{ for } (\delta + \theta) = 0°$$

Figure 6:
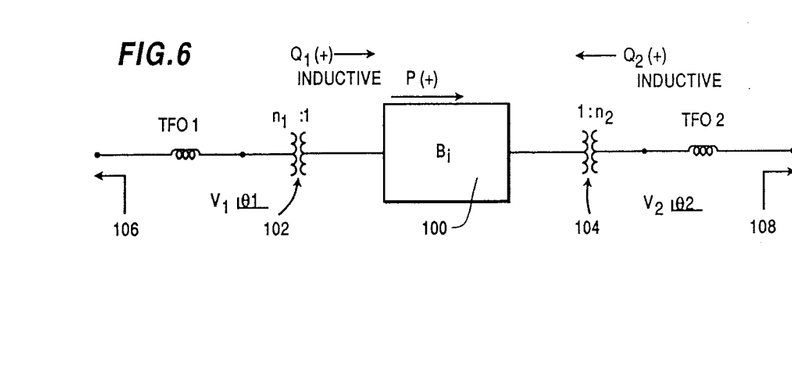
FIG. 6 is a diagram illustrating the principle of operation of the interconnection system and method according to a preferred embodiment of the present invention.

Thus, for example, in the system shown on FIG. 6, one can see a system 100 interconnected by each of its side to first and second transformer means 102 and 104 which are respectively connected to the first and second networks 106 and 108. Let us suppose that $n_1 = 1.2$, $n_2 = 1/1.2 = 0.8333$, $V_1 = 1$ RMS volt, $V_2 = 1$ RMS volt, $\theta_1 = 0°$, $\theta_2 = -220°$ et $\delta = \theta_1 - \theta_2 = 220°$. Let us also suppose that the system is required to supply an active power P of 1.5 watt to be transferred, a reactive power $Q_1$, absorbed by the system with respect to the first network, of −0.2 var (capacitive) and a reactive power $Q_2$, absorbed by the system with respect to the second network, of −0.05 var (capacitive). By using the aforesaid relations, we can obtain a value $\theta = 15.2°$, $B_M = 1.295$ and $k = 0.2012$.

We can now calculate the values of B1, B2, B3 and B4 according to the aforesaid equations, and we can obtain B1 = j 0.4640, B2 = −j 0.5997, B3 = j 0.3368 and B4 = −j 0.4024. Then, we can establish for this angular phase shift & between the networks that B1 is a capacitor of 1230.9 μF, B2 is an inductance of 4.4232 mH, B3 is a capacitor of 893.49 μF and B4 is an inductance of 6.5927 mH. For a three-phase system we will obtain a three-phase P of 3.75 watt, a three-phase $Q_1$ of $-0.6$ var and a three-phase $Q_2$ of $-0.15$ var. The leakage impedances TFO1 and TFO2 of the input and output transformers have been neglected for this example.

Although the present invention has been described hereinabove by way of preferred embodiments thereof, it should be pointed out that any modification to these preferred embodiments, within the scope of the appended claims, is not deemed to change or alter the nature and scope of the present invention.

What is claimed is:

1. A system for interconnecting a first and a second three-phase alternating electric networks operating synchronously or asynchronously at respective three-phase alternating voltages of equal or adjacent frequencies, comprising:

first transformer means having (a) primary windings supplied with the three-phase voltage of the first network, and (b) secondary windings for producing from the three-phase voltage of the first network a first and a second secondary three-phase voltages, each phase of the first secondary voltage being out of phase with respect to one of the phases of the second three-phase voltage by a first angle;

second transformer means having (a) primary windings supplied with the three-phase voltage of the second network, and (b) secondary windings for producing from the three-phase voltage of the second network a third and a fourth secondary, three-phase voltages, each phase of the third secondary voltage being out of phase with respect to one of the phases of said fourth voltage by a second angle different from said first angle;

a plurality of variable reactive impedances for establishing between each phase of said first and second voltages and two phases of said third and fourth voltages out of phase by said second angle, two single-phase interconnections of variable susceptances, respectively; and regulating means for measuring electric parameters related to the operation of the first and second networks, and for operating the variable reactive impedances in relation to the so measured parameters in order to vary the susceptances of the said interconnections so as to establish through said interconnections and said first and second transformer means a desired transfer of electric active power from one of the first and second networks to the other network while maintaining at a desired level an electric reactive power engaged in said transfer of active power.

2. The interconnection system of claim 1, wherein said first angle has a value of 180° and said second angle has a value of 90°.

3. The interconnection system of claim 2, in which:

said first, second, third and fourth secondary, three-phase voltages each comprise a phase A, a phase B, and a phase C;

the phases A, B and C of the first secondary voltage are out of phase by an angle of 180° with respect to the phases A, B and C of said second voltage, respectively; and the phases A, B and C of the third secondary voltage are out of phase by an angle of 90° with respect to the phases B, C and A of said fourth voltage, respectively.

4. The interconnection system of claim 1, in which said plurality of variable reactive impedances comprises means for establishing three groups of four single-phase interconnections, each including (a) a first interconnection, having a variable first susceptance, between a first phase amongst the phases of the first voltage and a second phase amongst the phases of said third voltage, (b) a second interconnection, having a second variable susceptance, between (1°) a third phase which is out of phase by said first angle with respect to said first phase, and (2°) said second phase, (c) a third interconnection, having a third variable susceptance, between said first phase and a fourth phase which is the phase of the fourth secondary voltage which is out of phase by said second angle with respect to said second phase, and (d) a fourth interconnection having a fourth variable susceptance, between said third phase and said fourth phase.

5. The interconnection system of claim 3, wherein said plurality of variable reactive impedances comprises means for establishing the following interconnections:

a first group of four single-phase interconnections including (a) a first interconnection, having a first variable susceptance, between the phases A of the first and third secondary voltages, (b) a second interconnection, having a second variable susceptance, between the phases A of the second and third secondary, three-phase voltages, (c) a third interconnection, having a third variable susceptance, between the phase A of the first voltage and the phase B of the fourth secondary voltage, and (d) a fourth interconnection, having a fourth variable susceptance, between the phase A of the second voltage and the phase B of said fourth voltage;

a second group of four single-phase interconnections including (a) a fifth interconnection, having said first susceptance, between the phases B of the first and third secondary voltages, (b) a sixth interconnection, having said second susceptance, between the phases B of the second and third three-phase voltages, (c) a seventh interconnection, having said third susceptance, between the phase B of the first voltage and the phase C of the fourth secondary voltage, and (d) an eighth interconnection, having said fourth susceptance, between the phase B of the second voltage and the phase C of the fourth secondary voltage; and a third group of four single-phase interconnections including (a) a ninth interconnection, having said first susceptance, between the phases C of the first and third voltages, (b) a tenth interconnection, having said second susceptance, between the phases C of the second and third three-phase voltages, (c) an eleventh interconnection, having said third susceptance, between the phase C of the first voltage and the phase A of the fourth secondary voltage, and (d) a twelfth interconnection, having said fourth susceptance, between the phase C of the second voltage and the phase A of the fourth secondary, three-phase voltage.

6. The interconnection system of claim 5, in which the primary and secondary windings of the first and second transformer means comprise means for causing no phase shift between the phases A, B and C of said first secondary voltage and the phases A, B and C of the third voltage, respectively.

7. The interconnection system of claim 2, wherein said primary and secondary windings of said first and second transformer means comprise means for causing no phase shift between said first and third secondary three-phase voltages.

8. The interconnection system of claim 6, in which:
the first transformer means comprises (a) three Y-connected primary windings supplied with the three-phase voltage of the first network, (b) three y-connected secondary windings for producing said first secondary, three-phase voltage, and (c) three $Y_6$-connected secondary windings for producing said second secondary, three-phase voltage; and the second transformer means comprises (a) three Y-connected primary windings supplied with the three-phase voltage of the second network, (b) three y-connected secondary windings for producing the third secondary, three-phase voltage, and (c) three $d_{11}$-connected secondary windings for producing the fourth secondary, three-phase voltage.

9. The interconnection system of claim 6, in which:
the first transformer means comprises (a) three Y-connected primary windings supplied with the three-phase voltage of the first network, (b) three $d_1$-connected secondary windings for producing said first secondary, three-phase voltage, and (c) three $d_7$-connected secondary windings for producing said second secondary, three-phase voltage; and the second transformer means comprises (a) three Y-connected primary windings supplied with the three-phase voltage of the second network, (b) three $d_1$-connected secondary windings for producing the third secondary, three-phase voltage, and (c) three y-connected secondary windings for producing the fourth secondary, three-phase voltage.

10. The interconnection system of claim 4, in which said plurality of variable reactive impedances comprises, to establish each of said three groups of four single-phase interconnections:
a first variable reactive impedance to establish the first and second interconnections, comprising (a) a first bank of inductors connected in parallel, (b) a first bank of capacitors connected in parallel, (c) first switch means connected in series with each of said inductors and capacitors of the first banks, and operated by said regulating means to vary the first and second susceptances, and (d) second switch means also operated by said regulating means for connecting each of said first inductor and capacitor banks between said first and second phases or between said third and second phases; and
a second variable reactive impedance to establish said third and fourth interconnections, comprising (a) a second bank of inductors connected in parallel, (b) a second bank of capacitors connected in parallel, (c) third switch means connected in series with each of said inductors and capacitors of the second banks, and operated by said regulating means to vary the third and fourth susceptances, and (d) fourth switch means also operated by said regulating means for connecting each of said second inductor and capacitor banks between said first and fourth phases or between said third and fourth phases.

11. The interconnection system of claim 6, in which the regulating means comprises:

means for calculating said first susceptance B1, said second susceptance B2, said third susceptance B3 and said fourth susceptance B4 using the following relationships:

$$B1 = -B \sin(\delta + \theta)$$

$$B2 = B \sin(\delta + \theta)$$

$$B3 = -B \cos(\delta + \theta)$$

$$B4 = B \cos(\delta + \theta)$$

where $\delta$ is a phase angle between the three-phase voltages of the first and second networks and constitutes one of said measured electric parameters, and B and $\theta$ are respectively a susceptance variable and an angle variable selected in function of the level of the desired transfer of active power from one of the first and second networks to the other network, and in function of the desired level of the reactive power engaged in said transfer of active power; and means for operating said variable reactive impedances to establish said first, fifth and ninth interconnections having said first calculated susceptance B1, to establish said second, sixth, and tenth interconnections having said second calculated susceptance B2, to establish said third, seventh, and eleventh interconnections having said third calculated susceptance B3, and to establish said fourth, eighth and twelfth interconnections having said fourth calculated susceptance B4.

12. The interconnection system of claim 1, in which said regulating means comprises means for calculating the susceptances of said single-phase interconnections in function of (a) said measured electric parameters and (b) an active power control signal and a reactive power control signal representative of the desired transfer of active power from one of the first and second networks to the other network and of the desired level of reactive power engaged in said desired transfer of active power, respectively, and means for operating said variable reactive impedances to establish said single-phase interconnections having the calculated susceptances.

13. The interconnection system of claim 1, wherein said regulating means comprises means for calculating the susceptances of said single-phase interconnections in function of (a) said measured electric parameters and (b) a voltage control signal representative of a desired level of the three-phase voltage of one of the first and second networks, and means for operating said variable reactive impedances to establish said single-phase interconnections having the calculated susceptances.

14. The interconnection system of claim 1, in which said regulating means comprises means for calculating the susceptances of said single-phase interconnections in function of (a) said measured electric parameters and (b) an active power control signal, a reactive power control signal, and a voltage control signal representative of the desired transfer of active power from one of the first and second networks to the other network, of the desired level of reactive power engaged in said desired transfer of active power, and of a desired level of the three-phase voltage of one of the first and second networks, respectively, and means for operating said variable reactive impedances to establish said single-phase interconnections having the calculated susceptances.

15. The interconnection system of claim 12, wherein said susceptance calculating means comprises means for giving priority to one of the two control signals, whereby the susceptances are calculated to establish with priority the desired quantity corresponding to the priority control signal.

16. The interconnection system of claim 14, wherein said susceptance calculating means comprises means for giving priority to at least one of the three control signals, whereby the susceptances are calculated to establish with priority the desired quantity corresponding to the said at least one priority control signal.

17. A system according to claim 1, wherein the first and second transformer means have respectively transformation ratios $n_1$ and $n_2$ selected so that:

$$\frac{V_1}{n_1} \neq \frac{V_2}{n_2}$$

where $V_1$ and $V_2$ are respectively the three-phase voltages of the first and second networks; and wherein
said two single-phase interconnections of variable susceptances are not conjugated so that said regulating means can vary said susceptances of said interconnections to establish a desired level of reactive power either absorbed or generated by the system with respect to one of said networks independently from a second desired level of reactive power either absorbed or generated by the system with respect to the second network, during the transfer of active power.

18. An interconnection system according to claim 17, wherein the first angle has a value of 180° and the second angle has a value of 90°.

19. An interconnection system according to claim 18, wherein
said first, second, third and fourth three-phased secondary voltages have each a phase A, a phase B and a phase C;
the phases A, B and C of the first secondary voltage are out of phase by an angle of 180° with respect to the phases A, B and C of said second voltage, respectively;
and the phases A, B and C of said third secondary voltage are out of phase by an angle of 90° with respect to the phases B, C and A of said fourth voltage respectively.

20. An interconnection system according to claim 19, wherein the plurality of variable reactive impedances comprises means for establishing the following interconnections:
a first group of four single-phase interconnections including (a) a first interconnection, having a first variable susceptance, between the phases A of the first and third secondary voltages, (b) a second interconnection, having a second variable susceptance, between the phases A of the second and third secondary three-phase voltages, (c) a third interconnection, having a third variable susceptance, between the phase A of the first voltage and the phase B of the fourth secondary voltage, and (d) a fourth interconnection, having a fourth variable susceptance, between the phase A of the second voltage and the phase B of the fourth voltage;
a second group of four single-phase interconnections including (a) a fifth interconnection, having said first susceptance, between the phases B of the first and third secondary voltages, (b) a sixth interconnection, having said second susceptance, between the phases B of the second and third three-phase voltages, (c) a seventh interconnection, having said third susceptance, between the phase B of the first voltage and the phase C of the fourth secondary voltage, and (d) an eighth interconnection, having said fourth susceptance between the phase B of the second voltage and the phase C of the fourth secondary voltage; and
a third group of four single-phase interconnections including (a) a ninth interconnection, having said first susceptance, between the phases C of the first and third voltages, (b) a tenth interconnection, having said second susceptance, between the phases C of the second and third three-phase voltages, (c) an eleventh interconnection, having said third susceptance, between the phase C of the first voltage and the phase A of the fourth secondary voltage, and (d) a twelfth interconnection, having said fourth susceptance, between the phase C of the second voltage and the phase A of the fourth secondary, three-phase voltage.

21. An interconnection system according to claim 20, wherein the primary and secondary windings of the first and second transformer means comprise means for causing no phase shift between the phases A, B and C of said first secondary voltage and the phases A, B and C of the third voltage, respectively.

22. An interconnection system according to claim 21, wherein said regulating means comprise:
means for calculating said first susceptance B1, said second susceptance B2, said third susceptance B3, and said fourth susceptance B4 according to the following equations:

$$B1 = \tfrac{1}{2}j(-B_M \sin(\delta+\theta) - k\sin^2(\delta+\theta))$$

$$B2 = \tfrac{1}{2}j(B_M \sin(\delta+\theta) - k\sin^2(\delta+\theta))$$

$$B3 = \tfrac{1}{2}j(-B_M \cos(\delta+\theta) - k\cos^2(\delta+\theta))$$

$$B4 = \tfrac{1}{2}j(B_M \cos(\delta+\theta) - k\cos^2(\delta+\theta))$$

where:

$$\delta = \theta_1 - \theta_2$$

$$\theta = \tan^{-1} \frac{[n_2^2 Q_2/V_2^2 - n_1^2 Q_1/V_1^2]}{P[n_1^2/V_1^2 - n_2^2/V_2^2]}$$

$$B_M = \frac{n_1 n_2 P}{V_1 V_2 \cos\theta}$$

$$k = \frac{(Q_1 - Q_2)}{V_1^2/n_1^2 - V_2^2/n_2^2}$$

where P is said desired transfer of electric active power, $Q_1$ is the reactive power either absorbed or generated by the system with respect to the first network, $Q_2$ is the reactive power either absorbed or generated by the system with respect to the second network, $\theta_1$ is the phase angle associated with the three-phase voltage of the said first network and $\theta_2$ is the phase-angle associated with the voltage of the second network; the variables P, $Q_1$ and $Q_2$ are selected respectively in function of the desired level of active power to be transferred from one of said networks to the other network, said desired level of reactive power either absorbed or generated by the system with respect to the first network, and said desired level of reactive power either absorbed or generated by the system with respect to the second network;

means for operating said variable reactive impedances to establish said first, fifth and ninth interconnections having said first calculated susceptance B1, to establish said second, sixth and tenth interconnections having said second calculated susceptance B2, to establish said third, seventh and eleventh interconnections having said third calculated susceptance B3, and to establish said fourth, eighth and twelfth interconnections having said fourth calculated susceptance B4.

23. An interconnection system according to claim 22, wherein said P variable is limited by the following equation:

$$-90° < \theta < 90°,$$

so that the value of P represent a desired transfer of electric active power from the first network to the second network.

24. An interconnection system according to claim 22, wherein said variable P is limited by the following equation:

$$90° < \theta < 270°,$$

so that the value of P represent a desired transfer of electric active power from the second network to the first network.

25. An interconnection system according to claim 22, wherein the variables $Q_1$ and $Q_2$ are limited by the following equation:

$$-1 < k < 1.$$

26. An interconnection system according to claim 6, wherein the regulating means comprise:

means for calculating said first susceptance B1, said second susceptance B2, said third susceptance B3, and said fourth susceptance B4, according to the following equations:

$$B1 = -\tfrac{1}{2}j\, B_M \sin(\delta + \theta)$$

$$B2 = \tfrac{1}{2}j\, B_M \sin(\delta + \theta)$$

$$B3 = -\tfrac{1}{2}j\, B_M \cos(\delta + \theta)$$

$$B4 = \tfrac{1}{2}j\, B_M \cos(\delta + \theta)$$

where:

$$\delta = \theta_1 - \theta_2$$

$$\theta = \tan^{-1}[-Q/P]$$

$$B_M = \frac{n_1 n_2 P}{V_1 V_2 \cos\theta}$$

where P is said desired transfer of electric active power, Q is said desired level of electric reactive power engaged in said transfer of active power, said engaged reactive power being a reactive power either absorbed or generated by said system with respect to the first and second networks, $\theta_1$ is the phase angle associated with the three-phase voltage of said first network and $\theta_2$ is the phase angle associated with the voltage of said second network, said variables P and Q are selected respectively in function of the desired level of active power to be transferred from one of said networks to the other network and said desired level of electric reactive power engaged during said transfer of active power;

means for operating said variable reactive impedances to establish said first, fifth and ninth interconnections having said first calculated susceptance B1, to establish said second, sixth, tenth interconnections having said second calculated susceptance B2, to establish said third, seventh and eleventh interconnections having said third calculated susceptance B3 and to establish said fourth, eighth and twelfth interconnections having said fourth calculated susceptance B4.

27. A method of interconnecting a first and a second three-phase alternating electric networks operating synchronously or asynchronously at respective three-phase alternating voltages of equal or adjacent frequencies. comprising the steps of:

producing from the three-phase voltage of the first network and by means of first transformer means, a first and a second secondary, three-phase voltages, each phase of the first secondary voltage being out of phase with respect to one of the phases of the second three-phase voltage by a first angle;

producing from the three-phase voltage of the second network and by means of second transformer means, a third and a fourth secondary, three-phase voltages, each phase of the third secondary voltage being out of phase with respect to one of the phases of said fourth voltage by a second angle different from said first angle;

by means of a plurality of variable reactive impedances, establishing two single-phase interconnections, having susceptances which can be varied, between each phase of the first and second voltages and two phases of the third and fourth voltages which are out of phase by said second angle, respectively;

measuring electric parameters related to the operation of the first and second networks; and     operating the variable reactive impedances in relation to said measured parameters in order to vary the susceptances of the said interconnections so as to establish through said interconnections and said first and second transformer means a desired transfer of electric active power from one of the first and second networks to the other network while maintaining at a desired level an electric reactive power engaged in said transfer of active power.

28. The interconnecting method of claim 27, wherein said first angle has a value of 180° and said second angle has a value of 90°.

29. The interconnecting method of claim 28, in which the first, second, third and fourth secondary three-phase voltages each comprise a phase A, a phase B, and a phase C, the phases A, B and C of the first secondary voltage being out of phase by an angle of 180° with respect to the phases A, B and C of said second voltage, respectively, and the phases A, B and C of the third secondary voltage being out of phase by an angle of 90° with respect to the phases B, C and A of the fourth, secondary voltage, respectively.

30. The interconnecting method of claim 29, wherein said interconnection establishing step comprises the steps of:
  interconnecting the phases A of the first and third secondary voltages through a first single-phase interconnection having a first variable susceptance;
  interconnecting the phase A of the second and third secondary three-phase voltages through a second single-phase interconnection having a second variable susceptance;
  interconnecting the phase A of said first voltage and the phase B of the fourth secondary voltage through a fourth single-phase interconnection having a third variable susceptance;
  interconnecting the phase A of said second voltage and the phase B of the fourth secondary voltage through a fourth single-phase interconnection having a fourth variable susceptance;
  interconnecting the phases B of said first and third voltages through a fifth single-phase interconnection having said first susceptance;
  interconnecting the phases B of the second and third secondary, three-phase voltages through a sixth single-phase interconnection having said second susceptance;
  interconnecting the phase B of the first voltage and the phase C of the fourth secondary voltage through a seventh single-phase interconnection having said third susceptance;
  interconnecting the phase B of said second voltage and the phase C of the fourth secondary voltage through an eighth single-phase interconnection having said fourth susceptance;
  interconnecting the phases C of the first and third secondary voltages through a ninth single-phase interconnection having said first susceptance;
  interconnecting the phases C of the second and third three-phase voltages through a tenth single-phase interconnection having said second susceptance;
  interconnecting the phase C of the first secondary voltage and the phase A of the fourth secondary voltage through an eleventh single-phase interconnection having said third susceptance; and
  interconnecting the phase C of said second voltage and the phase A of the fourth secondary voltage through a twelfth single-phase interconnection having said fourth susceptance.

31. The interconnecting method of claim 30, in which the first and second transformer means cause no phase shift between the phases A, B and C of the first secondary voltage and the phases A, B and C of said third voltage, respectively.

32. The interconnecting method of claim 28, wherein said first and second transformer means cause no phase shift between the first and third secondary three-phase voltages.

33. The interconnecting method of claim 31, in which said impedance operating step comprises the steps of:
  calculating said first susceptance B1, said second susceptance B2, said third susceptance B3 and said fourth susceptance B4 using the following relationships:

$$B1 = -B \sin(\delta+\theta)$$

$$B2 = B \sin(\delta+\theta)$$

$$B3 = -B \cos(\delta+\theta)$$

$$B4 = B \cos(\delta+\theta)$$

where $\delta$ is a phase angle between the three-phase voltages of the first and second networks and constitutes one of said measured electric parameters, and B and $\theta$ are respectively a susceptance variable and an angle variable selected in function of the level of the desired transfer of active power from one of the first and second networks to the other network and in function of the desired level of the reactive power engaged in said transfer of active power; and
  operating the variable reactive impedances to establish said first, fifth and ninth interconnections having said first calculated susceptance B1, to establish said second, sixth and tenth interconnections having said second calculated susceptance B2, to establish said third, seventh and eleventh interconnections having said third calculated susceptance B3, and to establish said fourth, eighth and twelfth interconnections having said fourth calculated susceptance B4.

34. The interconnecting method of claim 27, in which said impedance operating step comprises the step of calculating the susceptances of said single-phase interconnections in function of (a) the measured electric parameters, and (b) an active power control signal and a reactive power control signal representative of the desired transfer of active power from one of the first and second networks to the other network, and of a desired reactive power engaged in said desired transfer of active power, respectively, and the step of operating the variable reactive impedances to establish said single-phase interconnections having the calculated susceptances.

35. The interconnecting method of claim 27, wherein said impedance operating step comprises the step of calculating the susceptances of said single-phase interconnections in function of (a) the measured electric parameters, and (b) a voltage control signal representative of a desired level of the three-phase voltage of one of the first and second networks, and the step of operating the variable reactive impedances to establish said single-phase interconnections having the calculated susceptances.

36. The interconnecting method of claim 27, in which said impedance operating step comprises the step of calculating the susceptances of said single-phase interconnections in function of (a) the measured electric parameters, and (b) an active power control signal, a reactive power control signal, and a voltage control signal respectively representative of the desired transfer of active power from one of the first and second networks to the other network, of a desired reactive power engaged in said desired transfer of active power, and of a desired level of the three-phase voltage of one of the first and second networks, and the step of operating the variable reactive impedances to establish said single-phase interconnections having the calculated susceptances.

37. The interconnecting method of claim 34, wherein said susceptance calculating step comprises the step of giving priority to one of the two control signals, whereby the susceptances are calculated to establish with priority the desired quantity corresponding to the priority control signal.

38. The interconnecting method of claim 36, wherein said susceptance calculating step comprises the step of giving priority to at least one of the three control signals, whereby the susceptances are calculated to establish with priority the desired quantity corresponding to the said at least one priority control signal.

39. An interconnecting method according to claim 27, wherein:
said first and second transformer means have respectively transformation ratios $n_1$ and $n_2$ selected so that:

$$\frac{V_1}{n_1} \neq \frac{V_2}{n_2}$$

where $V_1$ and $V_2$ are respectively the three-phase voltages of said first and second networks; and
said two single-phase interconnections having variable susceptances are not conjugated so that said susceptances of said interconnections can be varied to establish a desired level of reactive power either absorbed or generated with respect to one of said networks independently of a second desired level of reactive power either absorbed or generated with respect to the other network, during the transfer of active power.

40. An interconnecting method according to claim 39, wherein said first angle has a value of 180° and said second angle has a value of 90°.

41. An interconnecting method according to claim 40, wherein the first, second, third and fourth three-phased secondary voltages comprise each a phase A, a phase B and a phase C, the phases A, B and C of the first secondary voltage being out of phase by an angle of 180° with respect to said phases A, B and C of said second voltage, respectively, and the phases A, B and C of said third secondary voltage being out of phase by an angle of 90° with respect to the phases B, C and A of the fourth secondary voltage, respectively.

42. An interconnecting method according to claim 41, wherein said step of establishing said interconnections comprises the following steps:
interconnecting the phases A of said first and third secondary voltages through a first single-phase interconnection having a first variable susceptance;
interconnecting the phases A of the second and third three-phase secondary voltages through a second single-phase interconnection having a second variable susceptance;
interconnecting the phase A of said first voltage and the phase B of the fourth secondary voltage through a third single-phase interconnection having a third variable susceptance;
interconnecting the phase A of said second voltage in the phase B of the fourth secondary voltage through a fourth single-phased interconnection having a fourth variable susceptance;
interconnecting the phases B of said first and third voltages through a fifth single-phase interconnection having said first susceptance;
interconnecting the phases B of the second and third secondary three-phase voltages through a sixth single-phase interconnection having said second susceptance;
interconnecting the phase B of the first voltage and the phase C of the fourth secondary voltage through a seventh single-phase interconnection having said third susceptance;
interconnecting the phase B of said second voltage and the phase C of the fourth secondary voltage through a eighth single-phase interconnection having said fourth susceptance;
interconnecting the phases C of the first and third secondary voltages through a ninth single-phase interconnection having said first susceptance;
interconnecting the phases C of the second and third three-phase voltages through a tenth single-phase interconnection having said second susceptance;
interconnecting the phase C of the first secondary voltage and the phase A of the fourth secondary voltage through an eleventh single-phase interconnection having said third susceptance; and
interconnecting the phase C of said second voltage and the phase A of the fourth secondary voltage through a twelfth single-phase interconnection having said fourth susceptance.

43. An interconnecting method according to claim 42, wherein the first and second transformer means cause no phase shift between the phases A, B and C of the first secondary voltage and the phases A, B and C of said third voltage, respectively.

44. An interconnecting method according to claim 43, wherein said step of operating the variable reactive impedances comprises the following steps:
calculating said first susceptance B1, said second susceptance B2, said third susceptance B3 and said fourth susceptance B4 by means of the following relationships:

$$B1 = \tfrac{1}{2}(-B_M \sin(\delta+\theta) - k \sin^2(\delta+\theta))$$

$$B2 = \tfrac{1}{2}(B_M \sin(\delta+\theta) - k \sin^2(\delta+\theta))$$

$$B3 = \tfrac{1}{2}(-B_M \cos(\delta+\theta) - k \cos^2(\delta+\theta))$$

$$B4 = \tfrac{1}{2}(B_M \cos(\delta+\theta) - k \cos^2(\delta+\theta))$$

where:

$$\delta = \theta_1 - \theta_2$$

$$\theta = \tan^{-1} \frac{[n_2^2 Q_2 / V_2^2 - n_1^2 Q_1 / V_1^2]}{P[n_1^2/V_1^2 - n_2^2/V_2^2]}$$

$$B_M = \frac{n_1 n_2 P}{V_1 V_2 \cos\theta}$$

$$k = \frac{(Q_1 - Q_2)}{V_1^2/n_1^2 - V_2^2/n_2^2}$$

where P is said desired transfer of electric active power, $Q_1$ is an electric reactive power either absorbed or generated with respect to said first network, $Q_2$ is a reactive power either absorbed or generated with respect to said second network, $\theta_1$ is the phase angle associated with the three-phase voltage of said first network and $\theta_2$ is said phase angle associated with said voltage of said second network; the variables P, $Q_1$ and $Q_2$ are selected according to said desired level of active power to be transferred from one of said networks to the other network, said desired level of reactive power either absorbed or generated with respect to said first network and said level of reactive power either absorbed or generated with respect to said second network;

operating the variable reactive impedances to establish said first, fifth, ninth interconnections having said first calculated susceptance B1, to establish said second, sixth and tenth interconnections having said second calculated susceptance B2, to establish said third, seventh and eleventh interconnections having said third calculated susceptance B3 and to establish said fourth, eighth and twelfth interconnections having said fourth calculated susceptance B4.

45. An interconnecting method according to claim 43, wherein P is limited by the following equation:

$$-90° < \theta < 90°,$$

so that P represents a desired transfer of electric active power from said first network to said second network.

46. An interconnecting method according to claim 43, wherein P is limited by the following equation:

$$90° < \theta < 270°,$$

so that P represents a desired transfer of active electric power from said second network to said first network.

47. An interconnecting method according to claim 44, wherein $Q_1$ and $Q_2$ are limited by the following equation:

$$-1 < k < 1.$$

* * * * *